United States Patent
Lee et al.

(10) Patent No.: US 7,239,808 B2
(45) Date of Patent: Jul. 3, 2007

(54) SUBSCRIBER INTERFACING DEVICE IN COMMUNICATION-BROADCASTING CONVERGENCE FTTH

(75) Inventors: Ki-Cheol Lee, Suwon-shi (KR); Chang-Dong Kim, Seoul (KR); Yun-Je Oh, Yongin-shi (KR); Jun-Ho Koh, Suwon-shi (KR)

(73) Assignee: Samsung Electronics Co., Ltd., Suwon-si, Gyeonggi-Do (KR)

(*) Notice: Subject to any disclaimer, the term of this patent is extended or adjusted under 35 U.S.C. 154(b) by 679 days.

(21) Appl. No.: 10/776,726

(22) Filed: Feb. 11, 2004

(65) Prior Publication Data

US 2005/0025485 A1 Feb. 3, 2005

(30) Foreign Application Priority Data

Jul. 30, 2003 (KR) ............... 10-2003-0052901

(51) Int. Cl.
*H04J 14/00* (2006.01)

(52) U.S. Cl. .................... 398/66; 398/67
(58) Field of Classification Search ........... 398/105, 398/66–73
See application file for complete search history.

(56) References Cited

U.S. PATENT DOCUMENTS 5,822,102 A * 10/1998 Bodeep et al. ............. 398/69

2003/0063847 A1 * 4/2003 BuAbbud ................. 385/24

FOREIGN PATENT DOCUMENTS

| JP | 62-020179 | 1/1987 |
|----|-----------|--------|
| JP | 2000-244393 | 9/2000 |
| JP | 2001-217783 | 8/2001 |

* cited by examiner

*Primary Examiner*—Shi K. Li
(74) *Attorney, Agent, or Firm*—Cha & Reiter, L.L.C.

(57) ABSTRACT

A subscriber interface device and method for transmitting a communication signal and a broadcasting signal to each subscriber in a communication-broadcasting convergence FTTH system. A subscriber interface, positioned in the ONU, modulates a first predetermined number of broadcasting signals selected by a subscriber among broadcasting signals received from an OLT, combines a baseband communication signal received from the OLT with the modulated broadcasting signals, and optically transmits the combined communication-broadcasting signal. A subscriber interface receiver positioned in an ONT, splits the combined communication-broadcasting signal, filters the split signals to respective frequency bands, modulates the filtered broadcasting signals, transmits the modulated broadcasting signals to a monitor of the subscriber, and transmits the filtered communication signal as a baseband signal to a communication terminal of the subscriber instead of a passband signal.

18 Claims, 13 Drawing Sheets

SUBSCRIBER INTERFACING DEVICE IN COMMUNICATION-BROADCASTING CONVERGENCE FTTH

CLAIM OF PRIORITY

This application claims priority under 35 U.S.C. § 119 to an application entitled "Subscriber Interfacing Device in Communication-Broadcasting Convergence FTTH," filed in the Korean Intellectual Property Office on Jul. 30, 2003 and assigned Serial No. 2003-52901, the contents of which are incorporated herein by reference.

BACKGROUND OF THE INVENTION

1. Field of the Invention

The present invention relates to the field of subscriber interface technologies. More particularly, the present invention relates to the transmitting of communication data and broadcasting/video data to subscribers in a communication-broadcasting convergence FTTH (Fiber To The Home).

2. Description of the Related Art

Data service, such as very high-rate Internet access, is now provided to communication and broadcasting subscribers via ADSL (Asymmetric Digital Subscriber Line), VDSL (Very High Bit-Rate Digital Subscriber Line), Ethernet LAN (Local Area Network), or by a cable modem. Meanwhile, broadcasting service is provided to subscribers by HFC (Hybrid Fiber Coaxial)-based cable broadcasting and satellite broadcasting. That is, the subscribers use different mediums for the communication and broadcasting services and the communication service is available at a mere rate of several mega bits per second.

Therefore, in order to offer high-rate, large-volume communication and broadcasting services to subscribers by overcoming the limitations of the conventional technologies, an FTTH system is generally required. The FTTH system deploys an optical fiber to the home of each subscriber. FTTH systems are divided largely into Passive Optical Network (PON) and Active Optical Network (AON).

A communication-broadcasting convergence FTTH system illustrated in FIG. 1 was previously proposed for the convergence of communication and broadcasting by FTTH. The FTTH system related to the present invention is comprised of an Optical Line Terminal (OLT) 100, an Optical Network Unit (ONU) 200, and an Optical Network Terminal (ONT) 300, which operate as described below.

The OLT 100 receives the digital broadcasting information from an external broadcasting network, and external data communication information through a digital broadcasting/video multiplexer (MUX) 101 and an Ethernet switch 102. A WDM (Wavelength Division Multiplex) MUX 103 in the OLT 100 converts the electrical signals received from the digital broadcasting/video MUX 101 and the Ethernet switch 102 to optical signals, multiplexes them, and subsequently transmits the multiplexed signal in WDM.

The ONU 200 WDM-demultiplexes the optical WDM signal received from the OLT 100 into broadcasting signals and communication signals, converts the demultiplexed signals into electrical signals, processes upstream information received from users, and optically transmits the broadcasting signals and communication signals selectively to the users.

The ONT 300 converts optical signals received from the ONU 200 into electrical signals and distributes the electrical signals according to services. The ONT also optically transmits upstream information from a user to the ONU 200.

With regard to the structure of the ONU 200 shown in FIG. 1, a WDM demultiplexer (DEMUX) 104 separates a received signal into a broadcasting signal and a communication signal. A digital broadcasting/video channel splitter 105 splits the broadcasting signal according to channels and feeds the split signals to a broadcasting switch 106. An Ethernet switch 107 and a controller 108 provide user channel selection information included in the upstream information from ONTs 300 to the broadcasting switch 106. The broadcasting switch 106 transmits user selected channel signals according to the user channel selection information to the respective ONTs 300 through subscriber interfaces 109-1 to 109-n.

Meanwhile, FIG. 1 also shows that the communication signal is provided to the respective ONTs 300 through the Ethernet switch 107 and the subscriber interfaces 109-1 to 109-n.

Subscriber interface technology that converges communication and broadcasting data, and delivers the converged data to subscribers is important to the above-described communication-broadcasting convergence FTTH system. The subscriber interface technology includes the subscriber interfaces 109-1 to 109-n of the ONU 200 and a subscriber interface 114 of the ONT 300. The convergence of communication and broadcasting signals for each user and the transmitting of the converged signal from the OLT 100 to the user/subscriber is a dominant factor that satisfies subscriber satisfaction with the service in the communication-broadcasting convergence FTTH system. Thus, the capability of being able to provide satisfactory subscriber interfacing is an important issue in the art.

FIGS. 2 and 3 are block diagrams of a conventional subscriber interface device. FIG. 2 is a block diagram of a subscriber interface transmitter in the FTTH ONU 200 in the communication-broadcasting convergence FTTH system.

Referring to FIG. 2, the subscriber interface transmitter includes a broadcasting/video MUX 201 for time-division-multiplexing user-selected broadcasting/video signals received from the broadcasting switch 106 (shown in FIG. 1), a first modulator 202 for modulating the multiplexed broadcasting/video signal by a carrier frequency ($f_1$) 204, a second modulator 203 for modulating a 125-Mbps Ethernet signal being a communication signal by a carrier frequency ($f_2$) 205, a combiner 206 for combining the modulated broadcasting/video and communication signals received from the first and second modulators 202 and 204, an optical transmitter/converter 110-1 for converting the electrical combination signal to an optical signal and transmitting it to the ONT 300, and an optical receiver/converter 111-1 for converting optical upstream information received from the ONT 300 to an electrical signal.

FIG. 3 is a block diagram of a subscriber interface receiver in the FTTH ONT 300 (shown in FIG. 1) in the broadcasting-communication convergence FTTH system.

Referring to FIG. 3, the subscriber interface receiver includes an optical receiver/converter 112 for receiving an optical signal from the ONU 200 and converting the optical signal to an electrical signal, a distributor 301 for distributing the communication-broadcasting convergence signal received from the optical receiver/converter 112, a first demodulator 302 for extracting a broadcasting/video signal by demodulating a signal received from the distributor 301 using a carrier frequency ($f_1$) 304, a second demodulator 303 for extracting a 125-Mbps Ethernet signal being a communication signal by demodulating a signal received from the distributor 301 using a carrier frequency ($f_2$) 305, a first LPF (Low Pass Filter) 306 for low-pass-filtering the broadcasting/video signal received from the first demodulator 302, a second LPF 307 for low-pass-filtering the communication signal received from the second demodulator 303, a broadcasting/video DEMUX 308 for demultiplexing the broadcasting/video signal received from the first LPF 306 and outputting video data for respective channels, and an optical transmitter for converting an electrical upstream signal including communication information and broadcasting channel selection information received from a user to an optical signal and transmitting the optical signal to the ONU 200 (shown in FIG. 1).

FIG. 4 illustrates an exemplary RF (Radio Frequency) spectrum of signals transmitted from and received at the subscriber interface device illustrated in FIGS. 2 and 3.

Referring to FIG. 4, the 125-Mbps Ethernet signal occupies a 500-MHz bandwidth including a main lobe and side lobes in a passband ($f_2$). The broadcasting/video signal is a Multi-Program Transport Stream (MPTS) signal containing a High Definition (HD) image and a Standard Definition (SD) image. If the broadcasting/video signal delivers two broadcasting/video channels in timed division multiplexing (TDM), it requires a data rate of about 62 Mbps. As illustrated in FIG. 4, if it is modulated using the frequency $f_1$, it occupies an about 250-MHz band including a main lobe and side lobes.

In general, a low-price optical transmitter for the FTTH system uses a bandwidth of 1 GHz or so. In the embodiment of the present invention as illustrated in FIG. 4, the 125-Mbps Ethernet signal occupies 50% or more of an available bandwidth, thereby wasting bandwidth. Only if the ratio of the carrier frequency is about ten or more times as high as the data rate will stable data transmission and reception be possible. However, the carrier frequency by which the 125-Mbps Ethernet signal is modulated is 250 to 750 MHz in the embodiment. If the carrier frequency is set as 750 MHz considering the bandwidth of the 125-Mbps Ethernet signal, the maximum ratio of the carrier frequency to the bandwidth is 6 (=750/125 MHz). As a result, it is difficult to achieve stable RF transmission and reception.

When 750 MHz is assigned as the Ethernet band, a maximum available carrier frequency to the broadcasting/video signal is decided at the level of 300 MHz, five or six times as high as a data rate (i.e. 62 Mbps). Hence, RF transmission and reception is difficult as the 125-Mbps Ethernet.

In addition, the broadcasting/video signal illustrated in FIG. 4 is a single signal supporting two channels at a data rate of 62 Mbps. Consequently, channel expandability is limited.

SUMMARY OF THE INVENTION

An aspect of the present invention is to provide a subscriber interface device for transmitting communication data and broadcasting/video data to a subscriber in a communication-broadcasting convergence FTTH system, which transmits a 125-Mbps Ethernet signal in a baseband, rather than a passband, in order to make the best use of a transmission/reception band.

Another aspect of the present invention is to provide a subscriber interface device for enabling stable RF transmission and reception by allowing the use of a high carrier frequency for digital modulation of a broadcasting/video signal.

Yet another aspect of the present invention is to provide a subscriber interface device for enabling a broadcasting/video signal to support 7 or more broadcasting/video channels, even when an optical transmitter of 1 GHz or so is adopted, so that higher channel expandability is achieved relative to the convention technology.

The above aspects are provided by a subscriber interface device for transmitting a communication signal and a broadcasting signal to each subscriber in a communication-broadcasting convergence FTTH system. The communication-broadcasting convergence FTTH system has an OLT for transmitting digital broadcasting information received over an external broadcasting network and received external data communication information. An ONU separates optical signals received from the OLT into broadcasting signals and communication signals, converts the broadcasting and communication signals into electrical signals, processes upstream information received from subscribers, and optically transmits the broadcasting and communication signals selectively according to the individual subscribers. An ONT converts an optical signal received from the ONU into an electrical signal, splits the electrical signal for respective services, and transmits the split electrical signals to a subscriber terminal. The subscriber interface device includes a subscriber interface transmitter and a subscriber interface receiver. The subscriber interface, positioned in the ONU, modulates a first predetermined number of broadcasting signals selected by a subscriber among broadcasting signals received from the OLT, combines a baseband communication signal received from the OLT with the modulated broadcasting signals, and optically transmits the combined communication-broadcasting signal. the subscriber interface receiver positioned in the ONT, splits the combined communication-broadcasting signal, filters the split signals to respective frequency bands, modulates the filtered broadcasting signals, transmits the modulated broadcasting signals to a monitor of the subscriber, and transmits the filtered communication signal as a baseband signal to a communication terminal of the subscriber.

BRIEF DESCRIPTION OF THE DRAWINGS

The above aspects as well as other features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention are described herein below with reference to the accompanying drawings. For the purposes of clarity and simplicity, well-known functions or constructions are not described in detail as they would obscure the invention with unnecessary detail.

According to the present invention, a subscriber interface device transmits a 125-Mbps Ethernet signal as a baseband signal without modulation, so that bandwidth is saved from the Ethernet signal and a high carrier frequency is assigned to a broadcasting/video signal in a communication-broadcasting convergence FTTH system. Therefore, stable RF transmission and reception is achieved.

Figure 5:
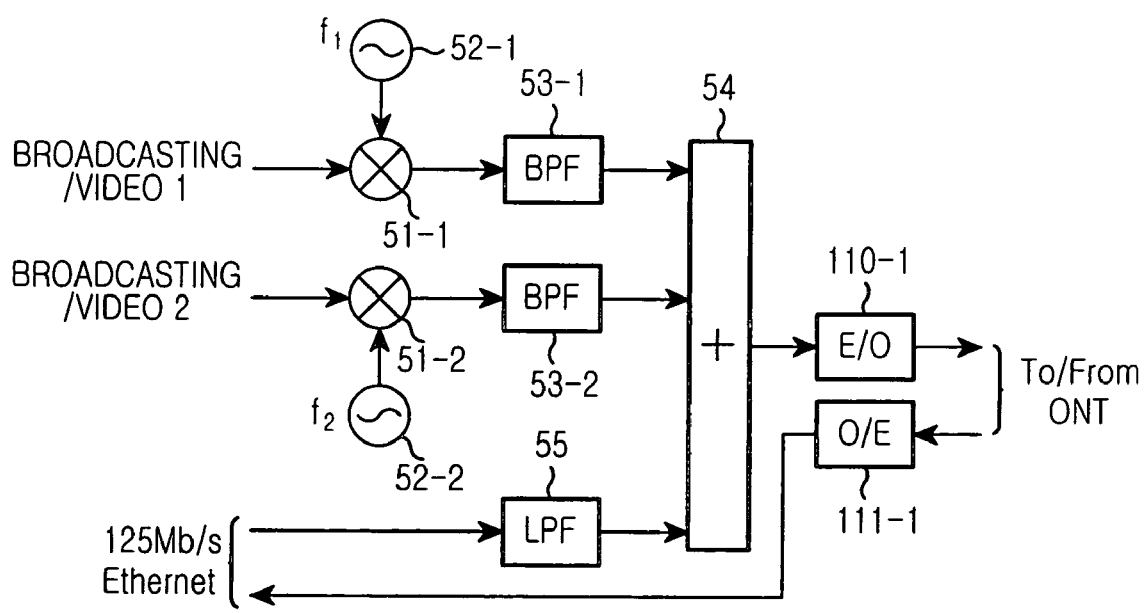
FIG. 5 is a block diagram of a subscriber interface transmitter in a communication-broadcasting convergence FTTH system according to an embodiment of the present invention.

FIG. 5 is a block diagram of a subscriber interface transmitter in a communication-broadcasting convergence FTTH system according to an embodiment of the present invention.

Referring to FIG. 5, the subscriber interface transmitter in the FTTH ONU 200 includes first and second modulators 51-1 and 51-2 for modulating respective broadcasting/video channel signals, first and second frequency generators 52-1 and 52-2 for generating carrier frequencies $f_1$, and $f_2$ to be assigned to the respective broadcasting/video channel signals, first and second BPFs (Band Pass Filters) 53-1 and 53-2 for limiting bands to suppress noise in the modulated signals, an LPF 55 for limiting the band of a 125-Mbps Ethernet signal, an RF combiner 54 for combining the 125-Mbps Ethernet baseband signal with the modulated broadcasting/video channel signals, an optical transmitter/converter 110-1 for converting the combined communication-broadcasting data to an optical signal and transmitting it to the FTTH ONT 300, and an optical receiver/converter for converting an optical Ethernet signal containing upstream information received from the FTTH ONT 300 to an electrical signal.

Figure 1:
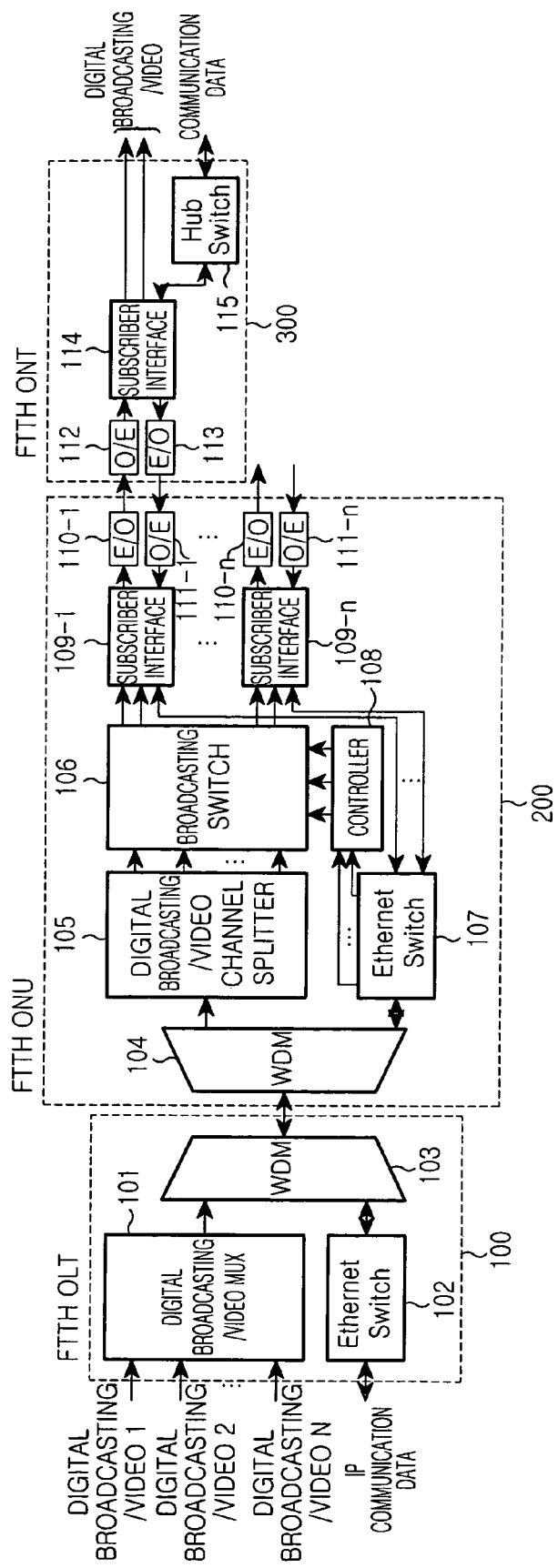
FIG. 1 is a block diagram of a communication-broadcasting convergence FTTH system to which the present invention is applied.
Figure 2:
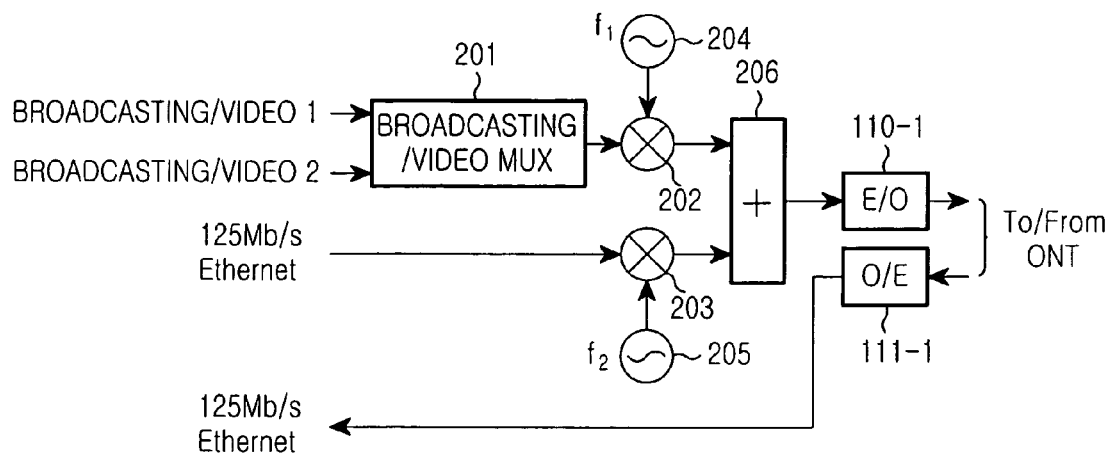
FIG. 2 is a block diagram of a subscriber interface transmitter in the communication-broadcasting convergence FTTH system.
Figure 3:
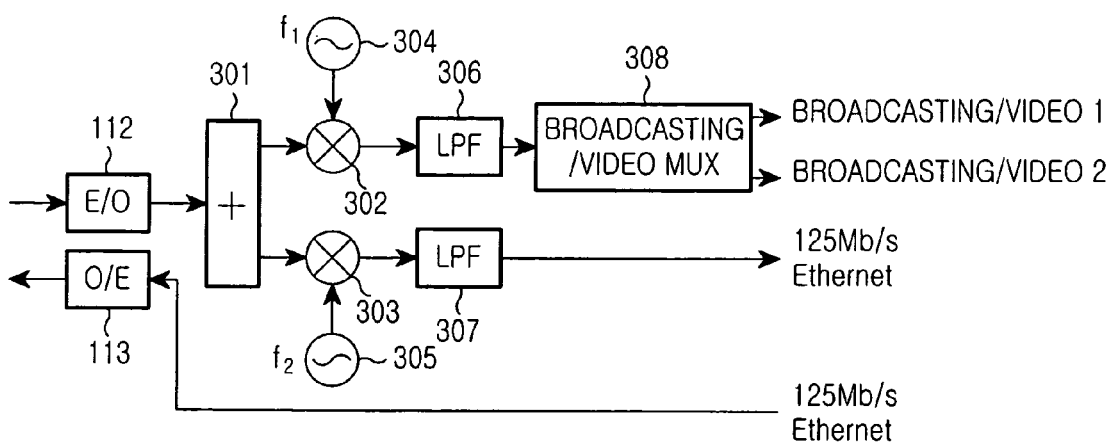
FIG. 3 is a block diagram of a subscriber interface receiver in the communication-broadcasting convergence FTTH system.
Figure 4:
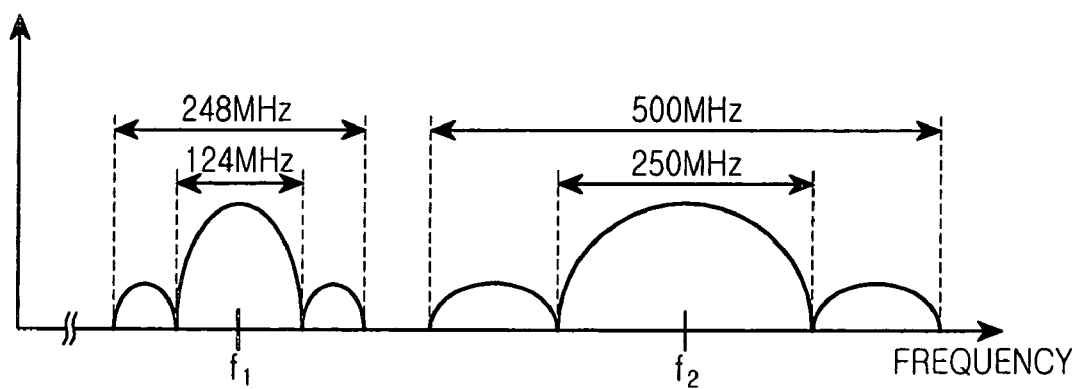
FIG. 4 illustrates the RF spectrum of a transmitted/received signal in the subscriber interface device illustrated in FIGS. 2 and 3.

In operation, the FTTH ONU 200 feeds broadcasting/video channel signals selected according to a subscriber request by the broadcasting switch 106 and a 125-Mbps Ethernet signal switched by the Ethernet switch 107 to the subscriber interface transmitter (as shown in FIG. 1).

With reference to FIG. 5, the first modulator 51-1 digitally modulates one of the broadcasting/video signals, broadcasting/video 1 by the carrier frequency $f_1$. The second modulator 51-2 digitally modulates the other broadcasting/video signals, broadcasting/video 2 by the carrier frequency $f_2$. The digital modulated broadcasting/video signals pass through the BPFs 53-1 and 53-2 having $f_1$, and $f_2$ as their respective central frequencies, for band restriction. The band of the 125-Mbps Ethernet signal is limited in the LPF 55 to minimize frequency interference with the modulated broadcasting/video signals, and combined with them in the RF combiner 54. The combined RF signal is optically modulated in the optical transmitter/converter 110-1 and transmitted to the FTTH ONT 300.

Figure 7:
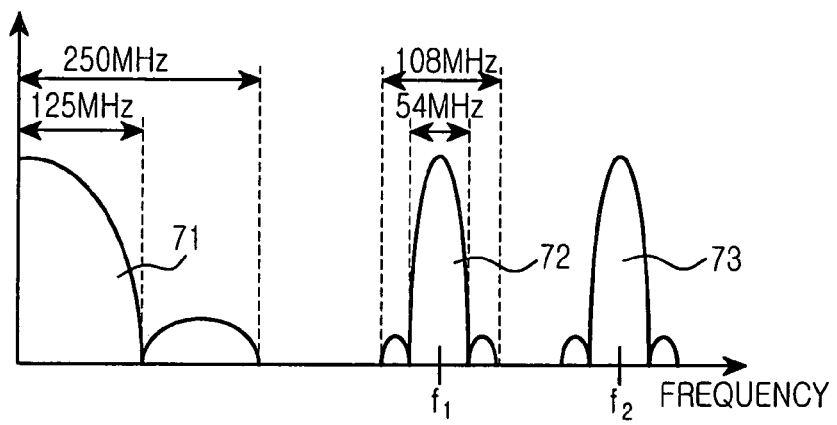
FIG. 7 illustrates the RF spectrum of a transmitted/received signal in the subscriber interface device illustrated in FIGS. 5 and 6.

A 125-Mbps Ethernet signal received from the FTTH ONT 300 through the optical receiver/converter 111-1 is fed to the Ethernet switch 107 in the FTTH ONU 200. The RF spectrum of the communication-broadcasting signal transmitted from the subscriber interface transmitter is illustrated in FIG. 7.

Figure 6:
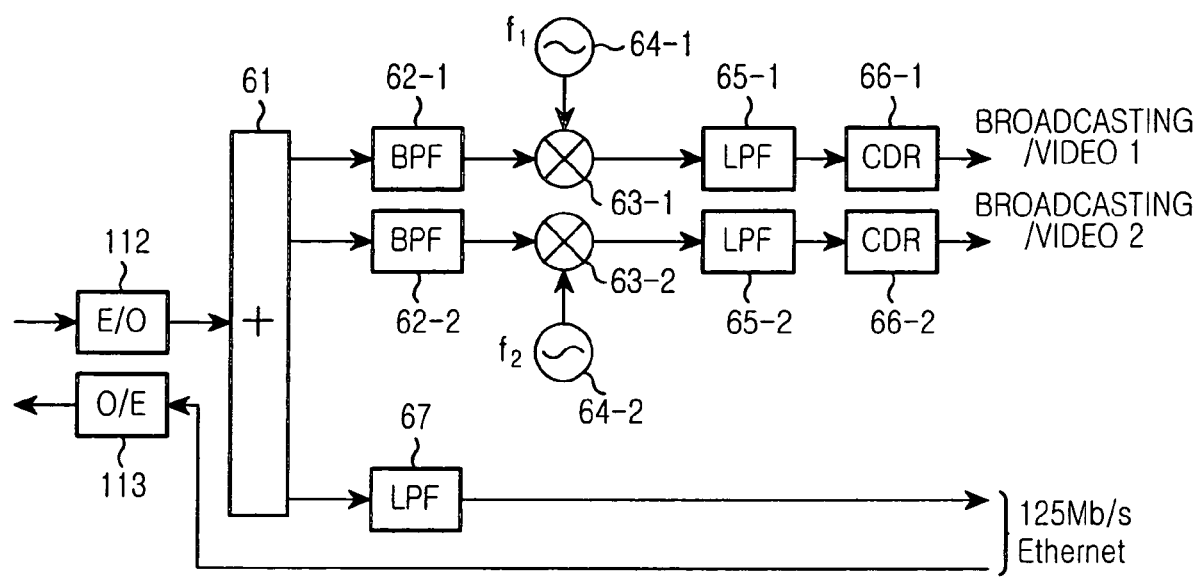
FIG. 6 is a block diagram of a subscriber interface receiver in the communication-broadcasting convergence FTTH system according to the embodiment of the present invention.

FIG. 6 is a block diagram of a subscriber interface receiver in the communication-broadcasting convergence FTTH system according to an embodiment of the present invention.

Referring to FIG. 6, the subscriber interface receiver in the FTTH ONT 300 includes an optical receiver/converter 112 for converting an optical signal received from the FTTH ONU 200 to an electrical signal, a splitter 61 for splitting broadcasting/video signals and a 125-Mbps Ethernet signal from the electrical signal, first and second BPFs 62-1 and 62-2 for limiting the bands of the respective broadcasting/video signals according to their channels, first and second demodulators 63-1 and 63-2 for demodulating the respective broadcasting/video signals received from the BPFs 62-1 and 62-2, first and second frequency generators 64-1 and 64-2 having Phase Locked Loops (PLLS)_ for generating demodulation frequencies $f_1$ and $f_2$ to demodulate the respective broadcasting/video signals, first and second LPFs 65-1 and 65-2 for extracting the demodulated broadcasting/video signals, first and second Clock & Data Recovery circuits (CDRs) 66-1 and 66-2 for recovering original broadcasting/video signals, an LPF 67 for extracting the 125-Mbps Ethernet signal, and an optical transmitter/converter 113 for transmitting an upstream Ethernet signal to the FTTH ONU 200.

In operation, the subscriber interface transmitter illustrated in FIG. 5 in the FTTH ONU 200 provides the communication-broadcasting signal to the optical receiver/converter 112 (shown in FIG. 6). It converts the optical signal to an electrical signal. The splitter 61 (shown in FIG. 6) splits the electrical signal into three signals (i.e., two broadcasting/video signals and one communication signal) in the embodiment of the present invention.

The signals split by splitter 61 respectively pass through one of: the first BPF 62-1 having a central frequency of $f_1$, the second BPF 62-2 having a central frequency of $f_2$, and the LPF 67 and become digital demodulated broadcasting/video 1, broadcasting/video 2, and 125-Mbps Ethernet signal.

Focusing on recovery of these signals, broadcasting/video 1 having the carrier frequency $f_1$, is demodulated through the first frequency generator 64-1 having a PLL and the first demodulator 63-1 and recovered to original broadcasting/video 1 through the first LPF 65-1 and the first CDR 66-1.

Similarly, broadcasting/video 2 having the carrier frequency $f_2$ is demodulated through the second frequency generator 64-2 having a PLL and the second demodulator 63-2 and recovered to original broadcasting/video 2 through the second LPF 65-2 and the second CDR 66-2.

The 125-Mbps Ethernet signal is connected as a communication signal directly to a subscriber through the LPF 67. Since the subscriber interface transmitter illustrated in FIG. 5 transmitted the Ethernet signal as a baseband signal, this obviates the need for demodulation in the subscriber interface receiver. Thus, the 125-Mbps Ethernet signal is connected as a communication signal directly to a subscriber terminal like a PC (Personal Computer).

Meanwhile, an upstream 125-Mbps Ethernet signal from the subscriber terminal connected to the FTTH ONT 300 is transmitted to the FTTH ONU 200 via the optical transmitter/converter 113.

FIG. 7 illustrates an exemplary RF spectrum of a transmitted/received signal in the subscriber interface device illustrated in FIGS. 5 and 6.

Referring to FIG. 7, a 125-Mbps Ethernet signal 71 occupies a 250-MHz band including a main lobe and side lobes in a baseband. Broadcasting/video signals 72 and 73 (broadcasting/video 1 and broadcasting/video 2) require a data rate of about 27 Mbps if they are HD images. Each of them occupies an about 108-MHz band including a main lobe and side lobes when they are modulated using the frequencies $f_1$, and $f_2$.

To describe the RF spectrum in more detail, the 125-Mbps Ethernet signal 71 is positioned in the baseband and occupies a 125-MHz RF band, limited in bandwidth by the LPF. If broadcasting/video 1 and broadcasting/video 2 are 27-Mbps MPTS signals, each of them has an about 108-MHz band. Therefore, the bandwidth of the 125-Mbps Ethernet signal is reduced, as compared to the conventional technology. Furthermore, the transmission of the Ethernet signal in a baseband leads to efficient utilization of the optical transmission band, and the carrier frequencies for digital modulation of the broadcasting/video channels are tens of times as high as the rates of the broadcasting/video channels. Therefore, stable transmission and reception is possible.

In other words, since the 125-Mbps Ethernet signal 71 occupies a 250-MHz RF band in a 1 GHz frequency band, broadcasting/video 1 and broadcasting/video 2 can exist and operate efficiently in a 250 to 1000-MHz RF band. In addition, modulation/demodulation is performed separately on the individual broadcasting/video signals. Hence, their data rates are only 27 Mbps even for HD images. Therefore, the central frequencies of the broadcasting/video signals are between 304 and 946 MHz. Considering the ratio of (carrier frequency)/(data rate) is between 304/27 and 946/27, far more stable data transmission can be achieved in the present invention than in conventional technology.

Figure 8:
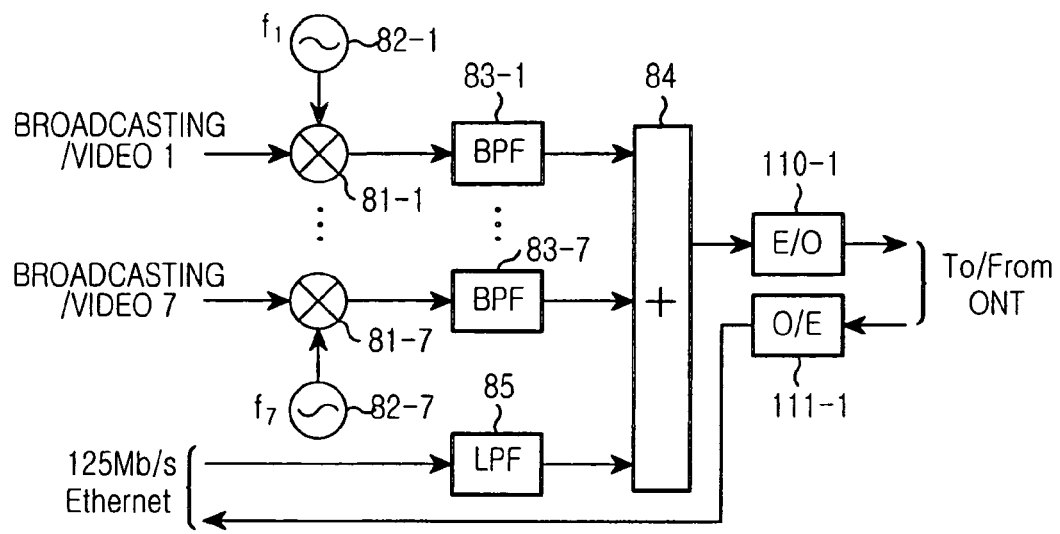
FIG. 8 is a block diagram of a subscriber interface transmitter in a communication-broadcasting convergence FTTH system according to another embodiment of the present invention.
Figure 9:
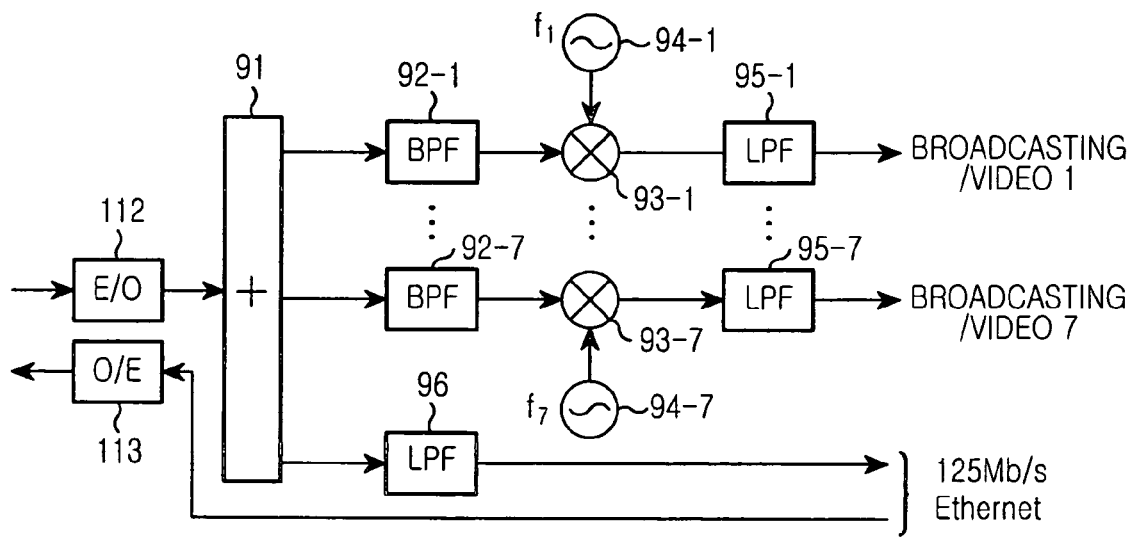
FIG. 9 is a block diagram of a subscriber interface receiver in the communication-broadcasting convergence FTTH system according to the second embodiment of the present invention.
Figure 10:
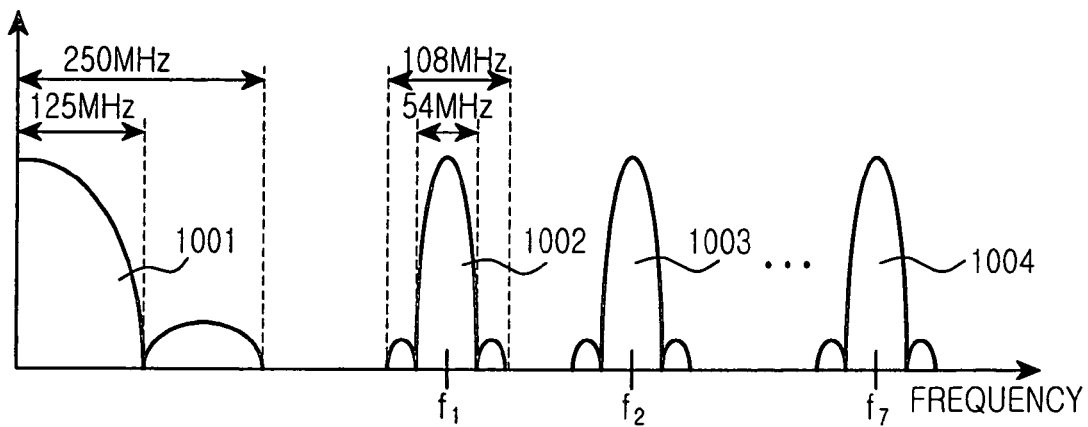
FIG. 10 illustrates the RF spectrum of a transmitted/received signal in the subscriber interface device illustrated in FIGS. 8 and 9.

FIGS. 8 and 9 illustrate a subscriber interface device supporting seven broadcasting/video channels according to another embodiment of the present invention, and FIG. 10 illustrates an exemplary RF spectrum of a transmitted/received signal in the subscriber interface device illustrated in FIGS. 7 and 8. In FIG. 10, a 125-MHz Ethernet signal 1001 occupies an about 250-MHz band, while 7 broadcasting/video signals 1002 to 1004 each occupy a 180-MHz band in the RF spectrum of the output of a subscriber interface transmitter illustrated in FIG. 8.

Figure 11:
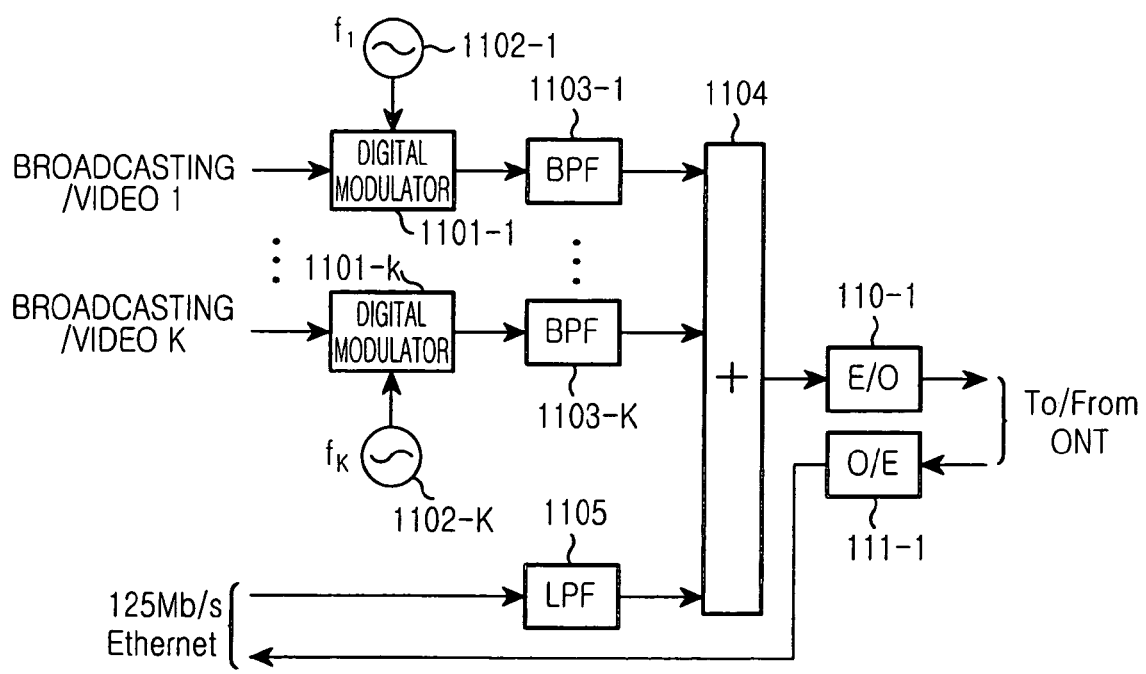
FIG. 11 is a block diagram of a subscriber interface transmitter in a communication-broadcasting convergence FTTH system according to a third embodiment of the present invention.
Figure 12:
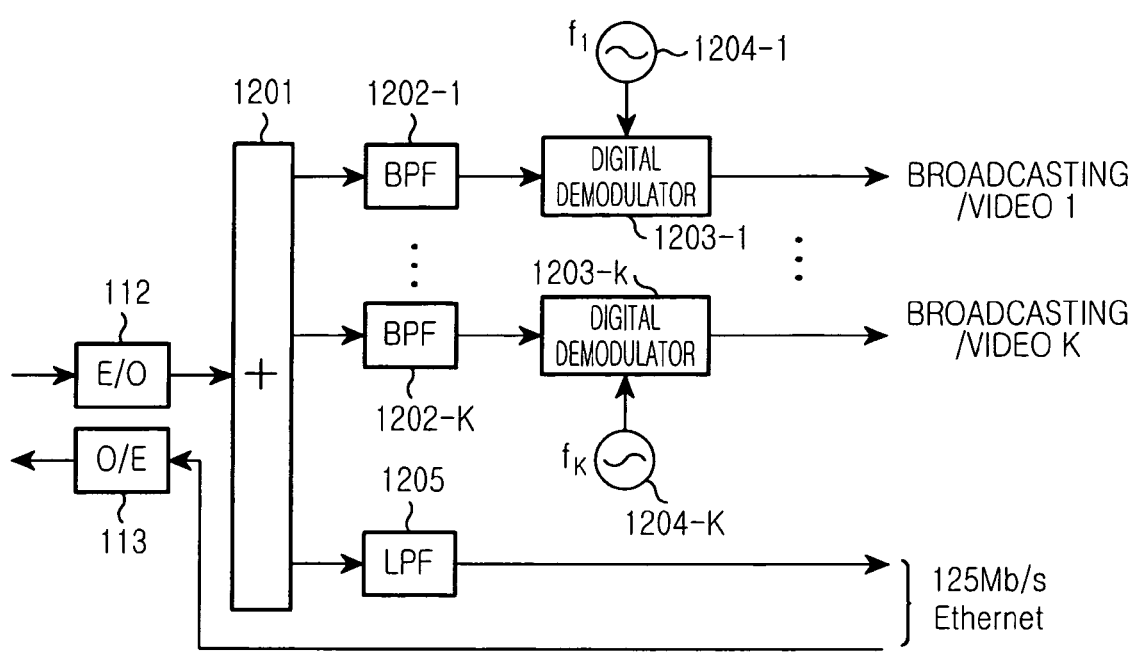
FIG. 12 is a block diagram of a subscriber interface receiver in the communication-broadcasting convergence FTTH system according to the third embodiment of the present invention.

FIGS. 11 and 12 illustrate a subscriber interface device using digital modulators 1101 and demodulators 1203 according to a third embodiment of the present invention.

Referring to FIGS. 11 and 12, the subscriber interface device supports a plurality of (K) broadcasting/video signals and is provided with Quadrature Phase Shift Keying (QPSK) or Quadrature Amplitude Modulation (QAM) digital modulators and demodulators for the K broadcasting/video signals instead of simple mixer-type modulators and demodulators, in addition to the components of the subscriber interface device illustrated in FIGS. 5 and 6. The structure of this subscriber interface device will be apparent from the above-described description of the subscriber interface device illustrated in FIGS. 5 and 6 and thus its description is not provided here.

FIGS. 13 to 19 provide spectral analysis of an exemplary RF spectrum data to verify the function of the inventive subscriber interface device.

Figure 13:
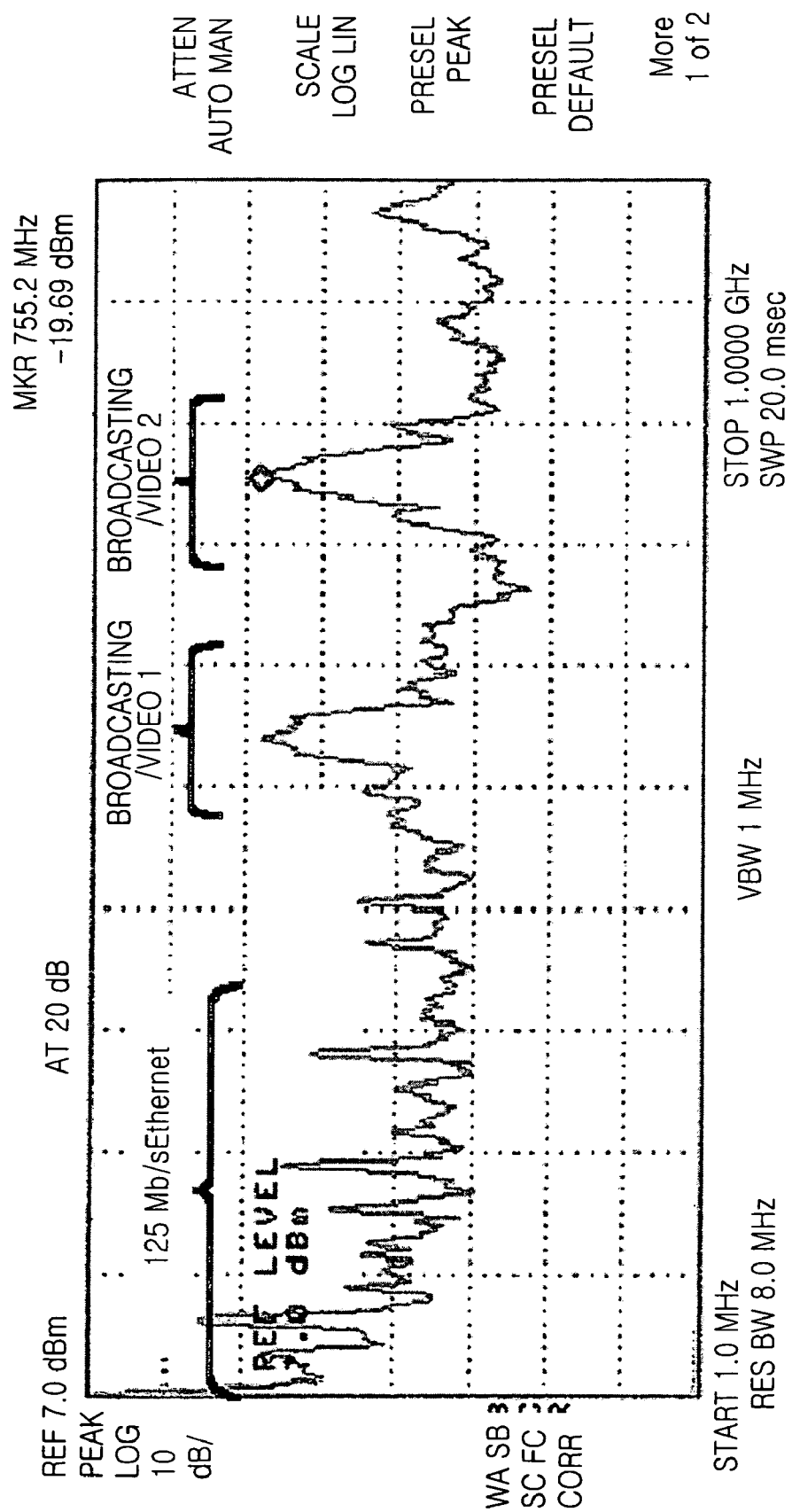
FIGS. 13 to 19 illustrate exemplary RF spectrum data to verify the function of the subscriber interface device according to the present invention.

FIG. 13 illustrates an exemplary RF spectrum of 125-Mbps Ethernet data and two 27-Mbps broadcasting/video data in combination in the inventive subscriber interface transmitter. Here, a horizontal axis represents frequency and a vertical axis represents signal strength. Referring to FIG. 13, broadcasting/video 1 uses a carrier frequency of 540 MHz, while broadcasting/video 2 uses a carrier frequency of 756 MHz. These carrier frequencies can be changed according to their use.

Figure 14:
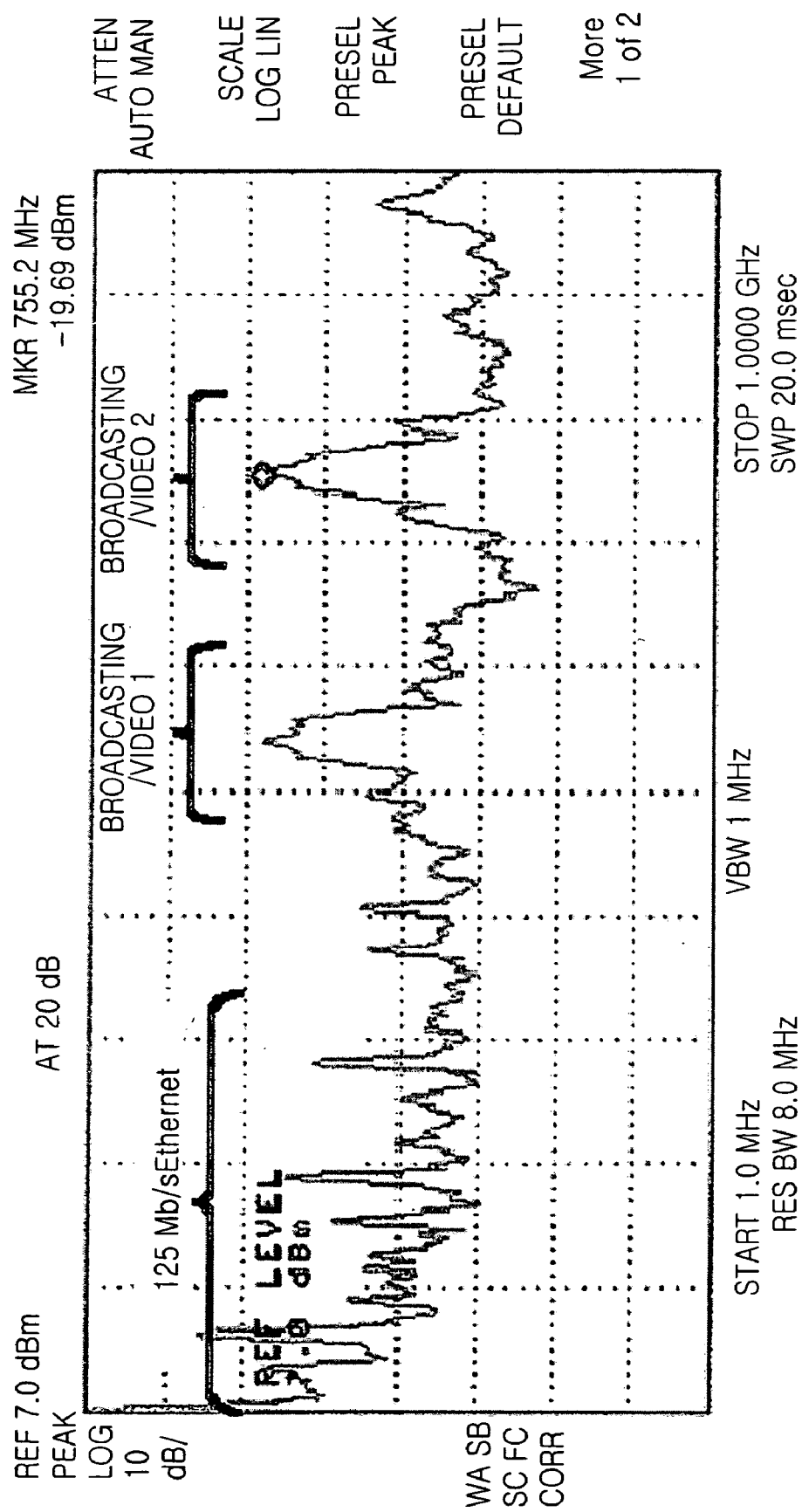

FIG. 14 illustrates an exemplary RF spectrum of a communication-broadcasting convergence signal received at the optical transmitter in the inventive subscriber interface receiver. Here, a horizontal axis represents frequency and a vertical axis represents signal strength.

Figure 15:
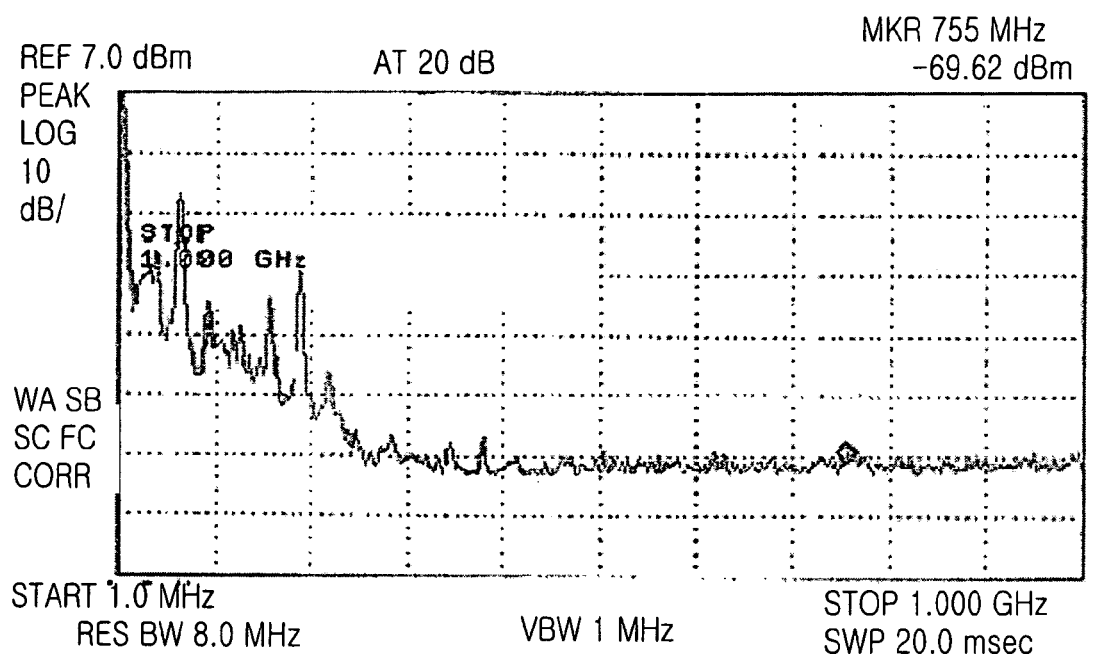

FIG. 15 illustrates an exemplary RF spectrum of a separated 125-Mbps Ethernet signal in the inventive subscriber interface receiver. Here, a horizontal axis represents frequency and a vertical axis represents signal strength.

Figure 16:
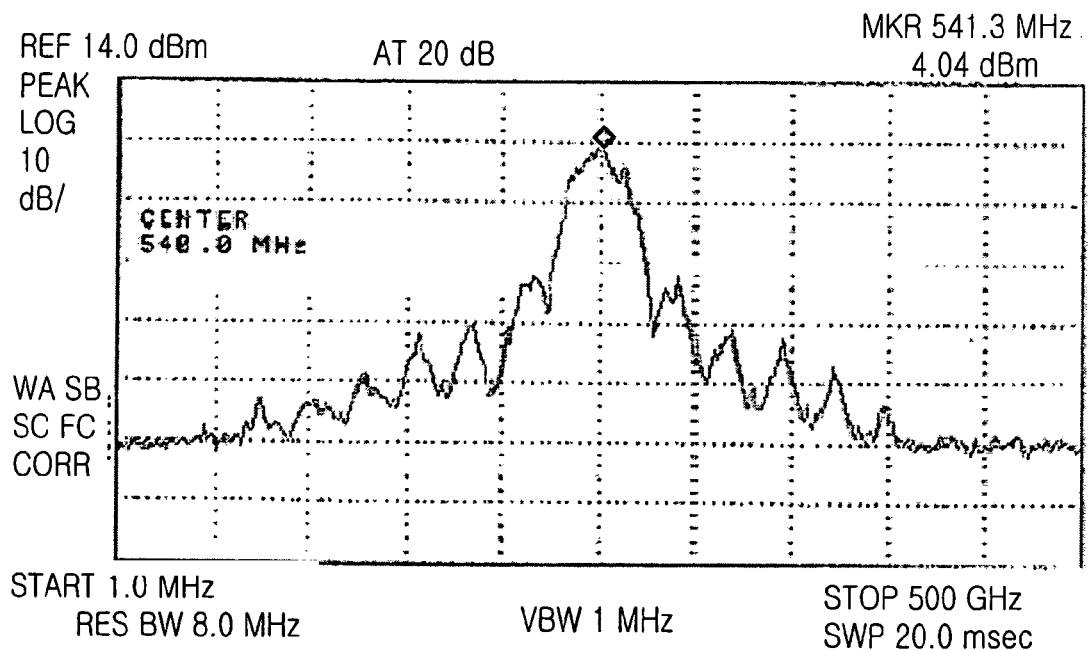

FIG. 16 illustrates an exemplary RF spectrum of separated broadcasting/video 1 in the inventive subscriber interface receiver. Here, a horizontal axis represents frequency and a vertical axis represents signal strength.

Figure 17:
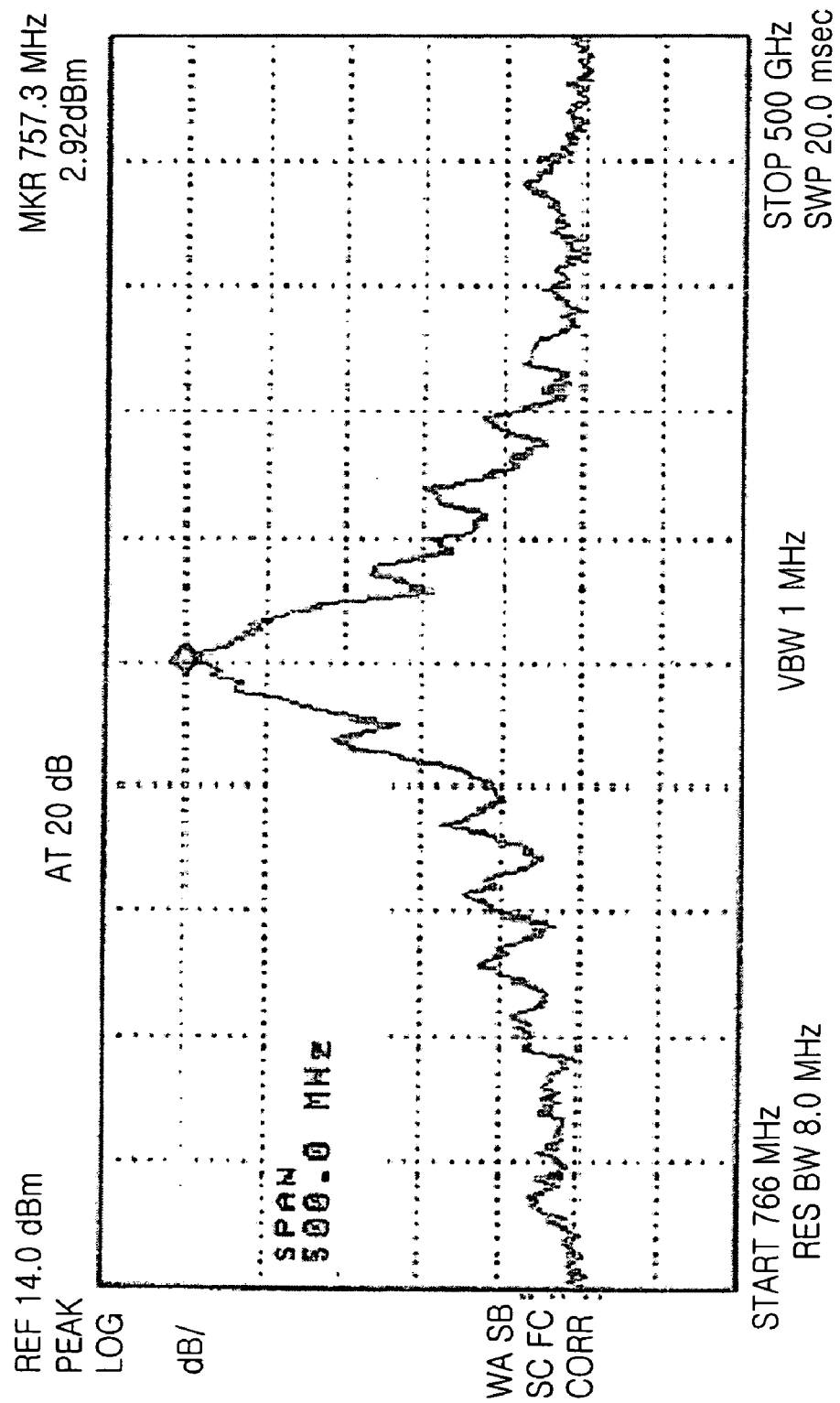

FIG. 17 illustrates an exemplary RF spectrum of separated broadcasting/video 2 in the subscriber interface receiver. Here, a horizontal axis represents frequency and a vertical axis represents signal strength.

Figure 18:
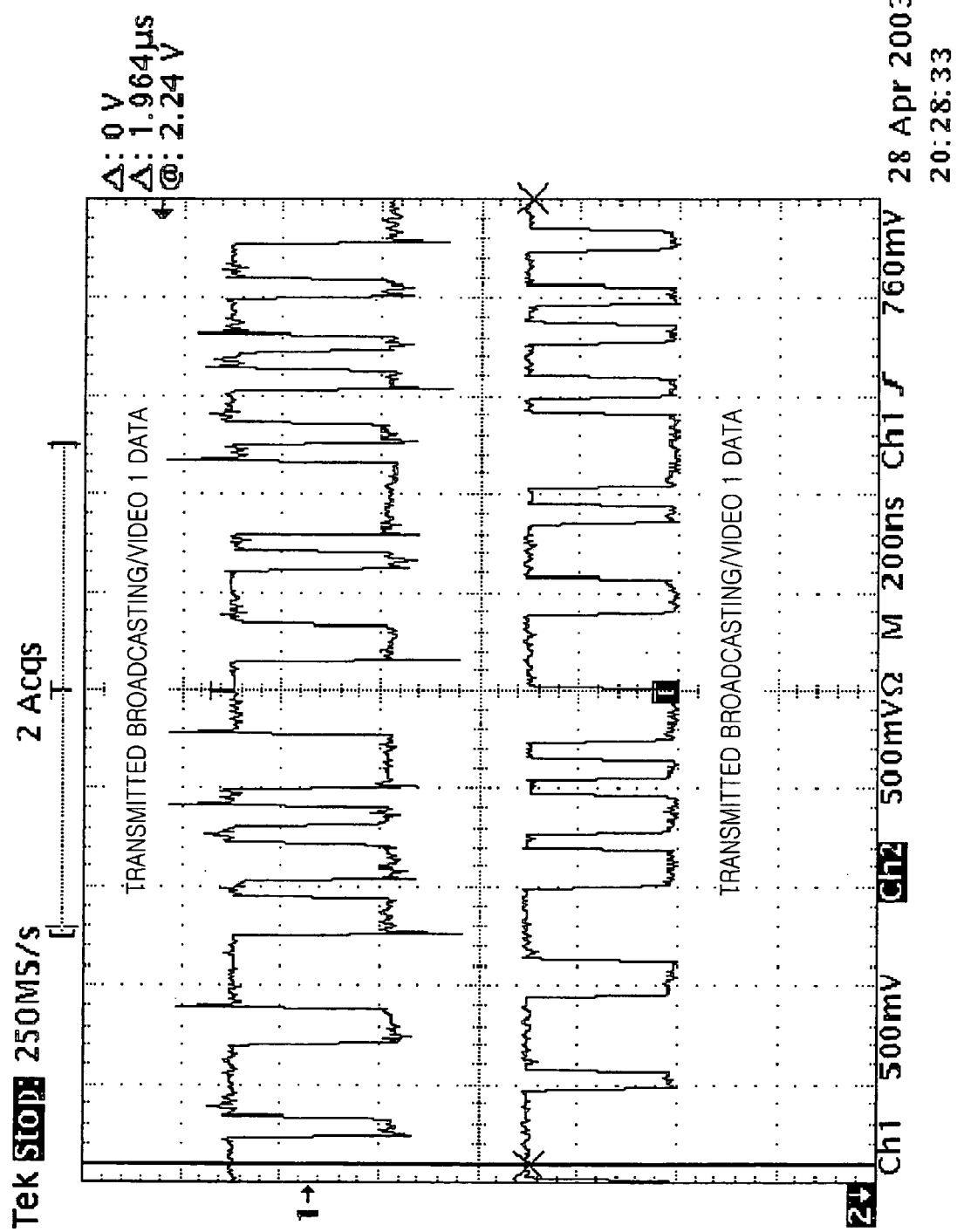

FIG. 18 illustrates a comparison between broadcasting/video 1 in the subscriber interface transmitter and broadcasting/video 1 after digital modulation, low-pass-filtering, and processing in the CDR in the subscriber interface receiver.

Figure 19:
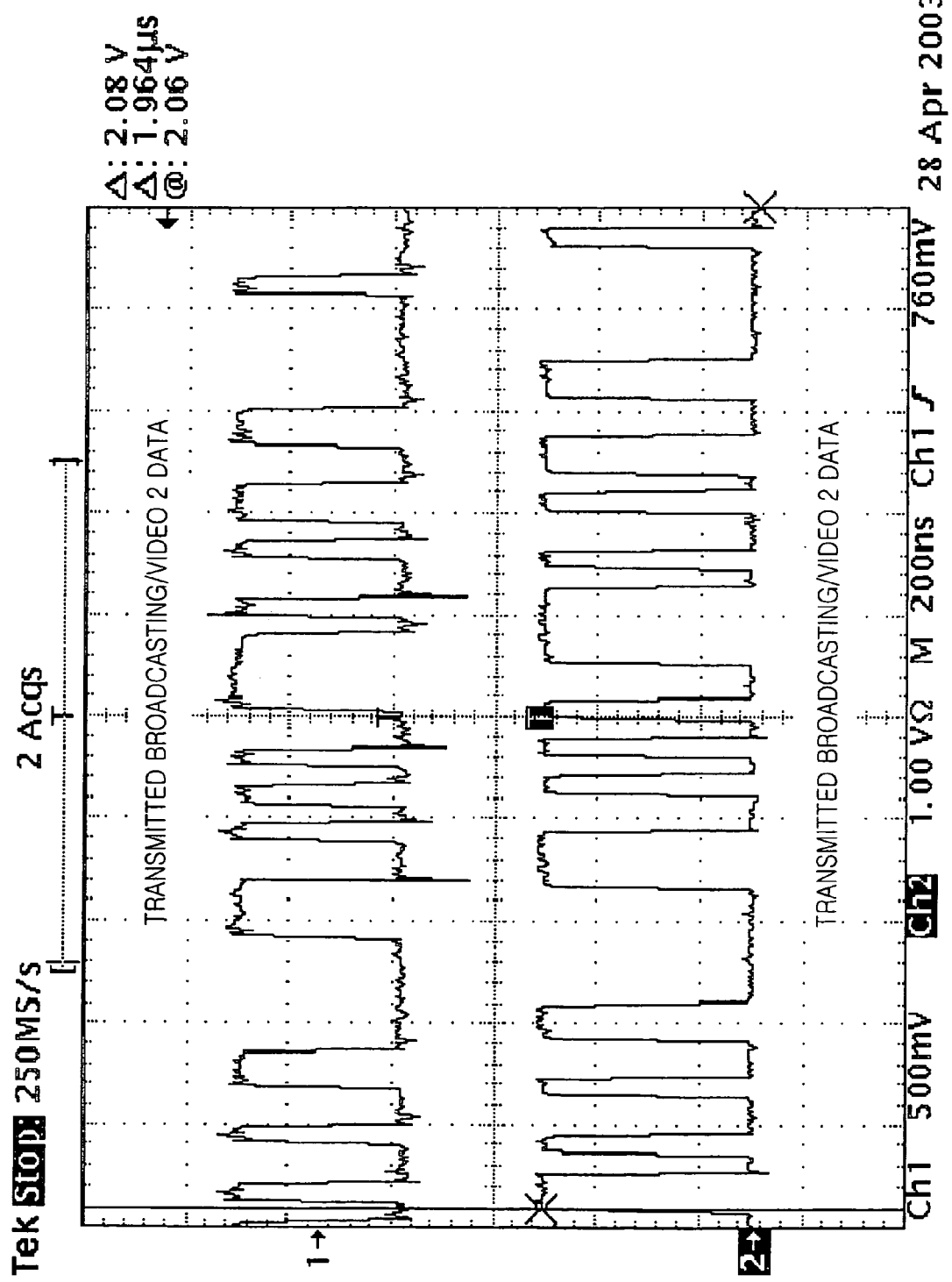

FIG. 19 illustrates a comparison between broadcasting/video 2 in the subscriber interface transmitter and broadcasting/video 2 after digital modulation, low-pass-filtering, and processing in the CDR in the subscriber interface receiver.

As noted from FIGS. 18 and 19, the subscriber interface receiver detects broadcasting/video signals transmitted from the subscriber interface transmitter without errors.

As described above, the present invention has the following effects:

(1) Transmission of a 125-Mbps Ethernet signal in a baseband, instead of a passband, maximizes utilization of the bandwidth of an optical transmitter/converter and receiver/converter in a communication-broadcasting convergence FTTH system.

(2) A high carrier frequency is available for digital modulation of a broadcasting/video signal. Hence, stable RF transmission and reception is facilitated.

(3) At least seven HD broadcasting/video channels are supported even when an optical transmitter having a band of 1 GHz or so, thereby offering high channel expandability as compared to the conventional technology.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A subscriber interface device for transmitting a communication signal and a broadcasting signal to each subscriber in a communication-broadcasting convergence FTTH (Fiber To The Home) system having an OLT (Optical Line Terminal) for transmitting digital broadcasting information received over an external broadcasting network and received external data communication information, an ONU (Optical Network Unit) for separating optical signals received from the OLT into broadcasting signals and communication signals, converting the broadcasting and communication signals to electrical signals, processing upstream information received from subscribers, and optically transmitting the broadcasting and communication signals selectively according to the individual subscribers, and an ONT (Optical Network Terminal) for converting an optical signal received from the ONU to an electrical signal, splitting the electrical signal for respective services, and transmitting the split electrical signals to a subscriber terminal, wherein the subscriber interface device comprises:

a subscriber interface transmitter arranged in the ONU, for modulating a first predetermined number of broadcasting signals selected by the subscriber among broadcasting signals received from the OLT, combining a baseband communication signal received from the OLT with the modulated broadcasting signals, and optically transmitting the combined communication-broadcasting signal; and a subscriber interface receiver arranged in the ONT, for splitting the combined communication-broadcasting signal received from the subscriber interface transmitter, filtering the split signals to respective frequency bands, demodulating the filtered broadcasting signals, transmitting the demodulated broadcasting signals to a monitor of the subscriber, and transmitting the filtered communication signal as a baseband signal to a communication terminal of the subscriber.

2. The subscriber interface device of claim 1, wherein the subscriber interface transmitter comprises:

the first predetermined number of modulators for demodulating the broadcasting signals respectively;

a predetermined number of frequency generators for generating carrier frequencies to be assigned to the broadcasting signals;

a predetermined number of BPFs (Band Pass Filters) for limiting the bands of the modulated broadcasting signals to suppress noise;

an LPF (Low Pass Filter) for limiting the band of the communication signal;

a combiner for combining the baseband communication signal with the modulated broadcasting signals;

an optical transmitter/converter for converting the electrical combined communication-broadcasting signal to an optical signal prior to transmission to the ONT; and an optical receiver/converter for receiving an Ethernet signal being upstream information received from the ONT and converting the optical Ethernet signal to an electrical signal.

3. The subscriber interface device according to claim 2, wherein the first predetermined number is one of 2 to 7.

4. The subscriber interface device of claim 2, wherein the modulators and demodulators modulate and demodulate by Quadrature Phase Shift Keying (QPSK).

5. The subscriber interface device of claim 2, wherein the modulators and demodulators modulate and demodulate by Quadrature Amplitude Modulation (QAM).

6. The subscriber interface device of claim 1, wherein the subscriber interface receiver comprises:

an optical receiver/converter for converting an optical signal received from the ONU;

a splitter for splitting the received optical into the first predetermined number of broadcasting signals and the communication signal;

a predetermined number of BPFs for limiting the bands of the split broadcasting signals to extract the individual broadcasting signals;

a predetermined number of demodulators for demodulating the broadcasting signals;

a predetermined number of frequency generators each having a PLL (Phase Locked Loop) for generating a demodulation frequency for each of the broadcasting signals;

a predetermined number of broadcasting signal outputs for outputting the first predetermined number of demodulated broadcasting signals;

an LPF for filtering the split communication signal in the baseband to extract the communication signal; and an optical transmitter for transmitting an upstream Ethernet signal to the ONU.

7. The subscriber interface device of claim 6, wherein the broadcasting signal outputs to a second LPF for extracting the demodulated broadcasting signals and a CDR (Clock & Data Recovery circuit) for recovering original broadcasting signals.

8. The subscriber interface device according to claim 7, wherein the first predetermined number is one of 2 to 7.

9. The subscriber interface device of claim 7, wherein the modulators and demodulators modulate and demodulate by Quadrature Phase Shift Keying (QPSK).

10. The subscriber interface device of claim 7, wherein the modulators and demodulators modulate and demodulate by Quadrature Amplitude Modulation (QAM).

11. The subscriber interface device according to claim 6, wherein the first predetermined number is one of 2 to 7.

12. The subscriber interface device of claim 6, wherein the modulators and demodulators modulate and demodulate by Quadrature Phase Shift Keying (QPSK).

13. The subscriber interface device of claim 6, wherein the modulators and demodulators modulate and demodulate by Quadrature Amplitude Modulation (QAM).

14. The subscriber interface device according to claim 1, wherein the first predetermined number is one of 2 to 7.

15. A method for transmitting a communication signal and a broadcasting signal to each subscriber in a communication-broadcasting convergence FTTH (Fiber To The Home) system having an OLT (Optical Line Terminal) for transmitting digital broadcasting information received over an external broadcasting network and received external data communication information, an ONU (Optical Network Unit) for separating optical signals received from the OLT into broadcasting signals and communication signals, converting the broadcasting and communication signals to electrical signals, processing upstream information received from subscribers, and optically transmitting the broadcasting and communication signals selectively according to the individual subscribers, and an ONT (Optical Network Terminal) for converting an optical signal received from the ONU to an electrical signal, splitting the electrical signal for respective services, and transmitting the split electrical signals to a subscriber terminal, wherein the method comprises the steps of:

(a) providing a subscriber interface transmitter that:
  (i) modulates a first predetermined number of broadcasting signals selected by the subscriber among broadcasting signals received from the OLT,
  (ii) combines a baseband communication signal received from the OLT with the modulated broadcasting signals, and
  (iii) optically transmits the combined communication-broadcasting signal; and
(b) providing a subscriber interface receiver that:
  (i) splits the combined communication-broadcasting signal received from the subscriber interface transmitter,
  (ii) filters the split signals to respective frequency bands,
  (iii) demodulates the filtered broadcasting signals,
  (iv) transmits the demodulated broadcasting signals to a monitor of the subscriber, and
  (v) transmits the filtered communication signal as a baseband signal to a communication terminal of the subscriber.

16. The method according to claim 15, wherein said subscriber interface transmitter includes:
  the first predetermined number of modulators for modulating the broadcasting signals respectively in step (a) (i);
  a predetermined number of frequency generators for generating carrier frequencies to be assigned to the broadcasting signals);
  a predetermined number of BPFs (Band Pass Filters) for limiting the bands of the modulated broadcasting signals to suppress noise);
  an LPF (Low Pass Filter) for limiting the band of the communication signal in step;
  a combiner for combining the baseband communication signal with the modulated broadcasting signals;
  an optical transmitter/converter for converting the electrical combined communication-broadcasting signal to an optical signal prior to transmission to the ONT; and
  an optical receiver/converter for receiving an Ethernet signal being upstream information received from the ONT and converting the optical Ethernet signal to an electrical signal.

17. The method according to claim 16, wherein the subscriber interface receiver provided in step (b) includes:
  an optical receiver/converter for converting an optical signal received from the ONU;
  a splitter for splitting the received optical into the first predetermined number of broadcasting signals and the communication signal;
  a predetermined number of BPFs for limiting the bands of the split broadcasting signals to extract the individual broadcasting signals;
  a predetermined number of demodulators for demodulating the broadcasting signals;
  a predetermined number of frequency generators each having a PLL (Phase Locked Loop) for generating a demodulation frequency for each of the broadcasting signals;
  a predetermined number of broadcasting signal outputs for outputting the first predetermined number of demodulated broadcasting signals;
  an LPF for filtering the split communication signal in the baseband to extract the communication signal; and
  an optical transmitter for transmitting an upstream Ethernet signal to the ONU.

18. The method according to claim 17, further comprising the step of:
  outputting the broadcasting signal to an LPF for extracting the demodulated broadcasting signals and a CDR (Clock & Data Recovery circuit) for recovering original broadcasting signals.

* * * * *